(12) United States Patent
Steinbusch et al.

(10) Patent No.: US 8,284,879 B2
(45) Date of Patent: Oct. 9, 2012

(54) LOSSLESS TRANSFER OF EVENTS ACROSS CLOCK DOMAINS

(75) Inventors: Otto Steinbusch, Mountain View, CA (US); Marino Strik, Waalre (NL); Robert De Gruijl, San Francisco, CA (US)

(73) Assignee: NXP B.V., Eindhoven (NL)

( * ) Notice: Subject to any disclaimer, the term of this patent is extended or adjusted under 35 U.S.C. 154(b) by 1353 days.

(21) Appl. No.: 10/562,342

(22) PCT Filed: Jun. 25, 2004

(86) PCT No.: PCT/US2004/020566
§ 371 (c)(1),
(2), (4) Date: Oct. 28, 2008

(87) PCT Pub. No.: WO2005/002129
PCT Pub. Date: Jan. 6, 2005

(65) Prior Publication Data
US 2011/0096880 A1  Apr. 28, 2011

Related U.S. Application Data

(60) Provisional application No. 60/482,357, filed on Jun. 25, 2003.

(51) Int. Cl.
*H04L 7/02* (2006.01)
*H04L 7/00* (2006.01)

(52) U.S. Cl. ........................................ 375/354; 375/359

(58) Field of Classification Search .................. 375/354, 375/359
See application file for complete search history.

(56) References Cited

U.S. PATENT DOCUMENTS

| | | | |
|---|---|---|---|
| 3,435,358 A | 3/1969 | Rheinfelder et al. | |
| 5,291,529 A | 3/1994 | Crook et al. | |
| 5,331,669 A * | 7/1994 | Wang et al. | 375/371 |
| 6,681,103 B1 | 1/2004 | Rogers et al. | |
| 2003/0081707 A1 | 5/2003 | Takeuchi et al. | |
| 2003/0081713 A1 | 5/2003 | Pontius et al. | |

FOREIGN PATENT DOCUMENTS

| | | | |
|---|---|---|---|
| EP | 1 091 298 | | 4/2001 |
| WO | WO 02/48722 | * | 6/2002 |

\* cited by examiner

*Primary Examiner* — David C. Payne
*Assistant Examiner* — Brian J Stevens

(57) ABSTRACT

Transfer circuits (200, 400, 500) for monitoring in a monitor clock domain target events that occur in a target clock domain (170) are disclosed. Some embodiments (200) impose significant constraints on the domain clocks and include: an event detector (210); a sending circuit (220) that changes the value of a request signal (150) with each event; and a receiving circuit (230) that detects changes in the request signal. Other embodiments work for a broader range of clocks and include: a counter (410) that generates an incremental count (415) of event occurrences while a transfer is taking place; sending and receiving registers (420, 430, 530) for the incremental count; the request sending and receiving circuits (220, 230), where the request signal changes value for each transfer of the incremental count; and sending and receiving circuits (470, 480) for an acknowledgement signal.

10 Claims, 6 Drawing Sheets

LOSSLESS TRANSFER OF EVENTS ACROSS CLOCK DOMAINS

CROSS REFERENCE TO RELATED APPLICATION

This application claims the benefit of U.S. provisional application Ser. No. 60/482,357 filed 25 Jun. 2003, which is incorporated herein whole by reference.

The invention relates generally to methods and apparatuses for designing digital electronic circuits, especially for designing such circuits that include multiple clock domains. More particularly, the invention relates to a circuit for transferring events between clock domains in order to monitor in one clock domain events that occur in a different clock domain.

Modern society and technology are increasingly based on electronics in general and on integrated circuits (ICs) in particular. Computers, mobile telephones, personal digital assistants (PDAs), microwave ovens, washing machines and automobiles are among the many devices that are often based on ICs, or that often include at least one IC.

Today, integrated circuits have reached a point in capacity where it is now commonplace to put an entire electronic system on a chip (SoC). Such SoCs are often aggregations of functional blocks or modules that were designed independently. It is common for such a module to have occupied an entire IC, or to have required several ICs to implement, when the module was originally designed.

Many ICs are based on synchronous or clocked logic in which all logic elements within a clock domain use the same clock. A clock is an electronic signal that constantly changes from a relatively low voltage to a relatively high voltage at a constant rate. For example, the voltage of a clock signal may be at about 0.3 volts for 10 nanoseconds (ns, or billionths of a second), then rise to about 3.0 volts within about 3 ns, then stay steady for about 10 ns, and then return to about 0.3 volts within about 3 ns.

Clocked circuits can be substantially simpler to design than circuits that are not clocked. However, clocked circuits impose constraints on when the non-clock signals within the circuit may legitimately change value. Typically, a signal coming into a clocked logic element must satisfy both a set-up time constraint and a hold time constraint, each of which is relative to the time at which the clock rises to 3.0 volts. For example, the incoming signal may have to stay steady at either about 0.3 volts or about 3.0 volts for 6 ns prior to when the clock rises and then for another 1 ns thereafter.

One problem arising with systems on a chip is that they often contain multiple clock domains. That is, modules within an SoC may have clocks that run at different speeds, clocks that run at the same speed but that have an unknown phase relationship, or both. The factors that make systems with multiple clocks advantageous are becoming increasingly important as the design and processing technologies used continue to advance and evolve.

Different clocks may be required within an SoC because clocks used in various circuitry external to the SoC may have different speeds. There may be circuits within the SoC that operate in close conjunction with such circuitry and thus should match the external clock speed. Different clocks may also be required because of the difficulty of precisely predicting and controlling the speed and phase relationship of two clocks; because of how clocks tend vary in speed and phase depending on variations in electrical noise levels, operating voltages, operating temperatures, or manufacturing processes; because of how the modules within a SoC were originally designed; because of the complexity or functionality of the modules; because of a need to increase overall system performance; or because of a need to have multiple operating modes. For example, a SoC may have a high-power, high-performance mode that uses particular power supply voltages and clock speeds and a lower-power, lower-performance mode that uses lower voltages and clock speeds.

When a signal crosses a boundary between clock domains, that is, when the signal is generated by a circuit that operates on one clock and is received by a circuit that operates on a different clock, then it is not possible for totally synchronous logic elements to satisfy the set-up and hold time constraints. Without special circuitry, it is common for inter-domain signals to violate set-up and hold constraints. Such violations are a serious problem because a signal that changes voltage during the set-up and hold period may result in it being unknown whether the output of the logic element will be based on the old value of the signal, or based on the new value of the signal.

Further, such violations are a serious problem because some commonly used logic elements can enter a meta-stable state when an incoming signal changes value during the set-up and hold period. In a meta-stable state, the voltage produced at the output of the logic element may change at random until the logic element stabilizes itself.

Further, such violations are a serious problem because they can be hard to detect in a design. Many engineers who design ICs are accustomed to clocked and synchronous circuit design within a single clock domain, and some may not be familiar with meta-stability problems that arise between clock domains.

Further, such violations are a serious problem because they can be hard to debug once an IC with such violations is manufactured. Such an IC may work correctly most of the time and may only malfunction occasionally. The circumstances under which such an IC malfunctions may appear to be random. This can make the task of identifying the problem exceedingly difficult.

The object of the invention is to provide an improved circuit for transferring events from one clock domain to another. Some embodiments of the invention advantageously impose few constraints on the two clocks, and thus can accommodate systems with clocks that have multiple modes or uncertain characteristics. Other embodiments are advantageously simple, small in IC area, low in latency, and able to run at high speeds.

One embodiment of the invention includes, in the target clock domain, means for detecting occurrences of the target event and, in response, for asserting a target-domain event signal, as well as means for changing the value of a request signal in response to the target-domain event signal. This embodiment further includes, in the monitor clock domain, means for asserting a monitor-domain event signal in response to changes in value of the request signal.

Another embodiment of the invention includes in the target clock domain: a counter; a sending register; and a request sending circuit. The counter generates an incremental count of the number of target events that occur within a time period. In response to a transfer signal, the counter transfers and clears the incremental count, the sending register loads the incremental count and then holds the incremental count, and the request sending circuit changes the value of a request signal.

This embodiment further includes in the monitor clock domain: a request receiving circuit; a receiving register; and an acknowledgement sending circuit. The request receiving circuit detects changes in the request signal and, in response thereto, generates a receive signal. In response to the receive signal, the receiving register loads the incremental count from the sending register, and the acknowledgement sending circuit changes the value of an acknowledgement signal.

This embodiment further includes, in the target clock domain, an acknowledgement receiving circuit and a control circuit. The acknowledgement receiving circuit detects changes in the acknowledgement signal and, in response thereto, generates a target-domain acknowledgement signal. The control circuit generates the transfer signal based on the incremental count in the counter and the target-domain acknowledgement signal.

Yet another embodiment of the invention includes in the target clock domain: a detector that asserts a target-domain event signal each time the target event occurs; and a sending circuit that changes the value of a request signal each time the target-domain event signal is asserted. This embodiment further includes, in the monitor clock domain, a receiving circuit that detects the change in the request signal and that asserts a monitor-domain event signal once for each change detected.

Objects, features and advantages of the invention will become apparent from the descriptions and discussions herein, when read in conjunction with the drawings. Technologies related to the invention, example embodiments of the invention, and example uses of the invention are illustrated in the drawings, which are as follows.

The descriptions, discussions and figures herein illustrate technologies related to the invention, show examples of the invention and give examples of using the invention. Known methods, procedures, systems, circuits, or elements may be illustrated and described without giving details so as to avoid obscuring the principles of the invention. On the other hand, details of specific embodiments of the invention are presented, even though such details may not apply to other embodiments of the invention.

Some descriptions and discussions herein use abstract or general terms including but not limited to: send, receive, transfer, equal, less than, hold, phase, clock, change, increment, assert, true or false. Those skilled in the art use such terms as a convenient nomenclature for components, data or operations within a computer, a digital or an electromechanical system. Such components, data and operations are represented by physical properties of actual objects including but not limited to electronic voltage, magnetic field, or optical reflectivity. For example, "asserted" or "true" may refer to an electronic signal that is around 3 volts and "not asserted" or "false" may refer to a signal around 0.3 volts, or vice versa. Similarly, perceptive or mental terms including but not limited to detect, determine and control may also refer to such components, data, operations or manipulations of physical properties.

Figure 1:
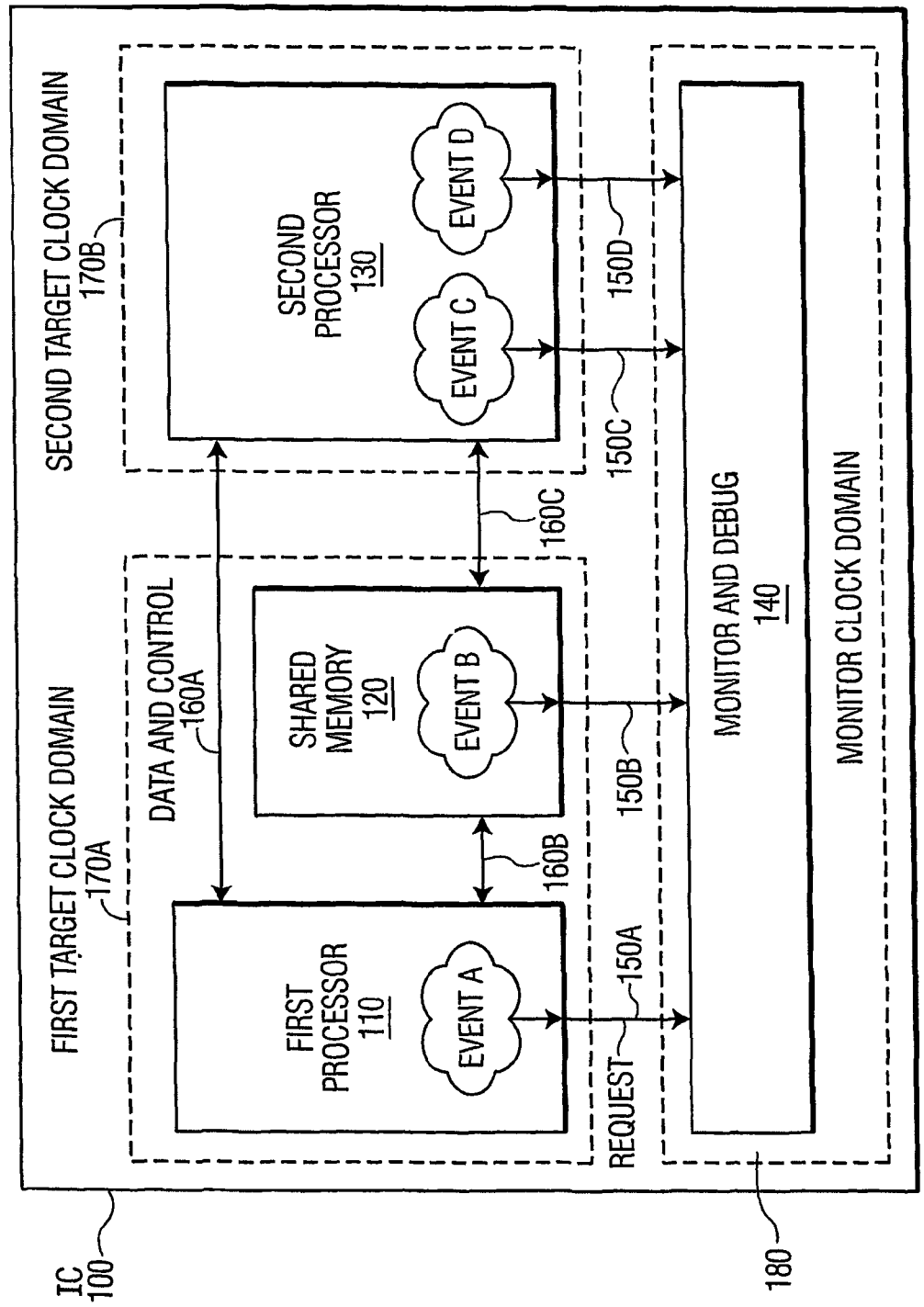
FIG. 1 shows the functional components and their interconnections in an integrated circuit (IC), according to an embodiment of the invention, that includes a monitor and debug module, a first processor, and a second processor, each operating on an independent clock.

FIG. 1 is a functional block diagram of an IC, according to an embodiment of the invention, that has three clock domains. The invention can be used in ICs of various designs and in systems that include multiple ICs. Thus, the system configuration of FIG. 1 is only one example among many.

Integrated circuit 100 includes monitor and debug module 140, first processor 110, shared memory 120, and second processor 130. The first processor and the shared memory operate on one clock and constitute first target clock domain 170A. Event A occurs within the first processor and results in a change in the value of request signal 150A, either a rising change or transition from low to high, or a falling transition from high to low. Request signal 150A is received within monitor and debug module 140. Event B occurs within the shared memory and results in a change in the value of request signal 150B, which is also received within monitor and debug module 140.

Second processor 130 operates on another clock and constitutes second target clock domain 170B. Events C and D occur within the second processor and result in changes in the value of request signals 150C and 150D, which are also received within monitor and debug module 140. Monitor and debug module 140 operates on the monitor clock and constitutes monitor clock domain 180.

Using an embodiment of the invention, monitor and debug module 180 is able to accurately determine the number of cycles in either target clock domain during which a target-domain event signal is asserted. No events are lost in the transfer between clock domains, nor are any extraneous events inserted. There is no need to pause, stall, stop or alter the rate at which target events are generated.

However, the invention does not convey certain information across clock domain boundaries. The exact number of cycles in which the target-domain event signal is not asserted is not known in the monitor domain. The exact interleaving of target-domain clock cycles having asserted event signals and those having non-asserted event signals is not known. Latency between the occurrence of a target-domain event and its reproduction or detection in the monitor clock domain is not a top priority. An arbitrary value can be transferred between clock domains by first serializing the value into a series of events, where the number of events in the series indicates the value. These omissions are deliberate in order that some embodiments of the invention be advantageously simpler, quicker and smaller than circuits that provide such capabilities.

Figure 2:
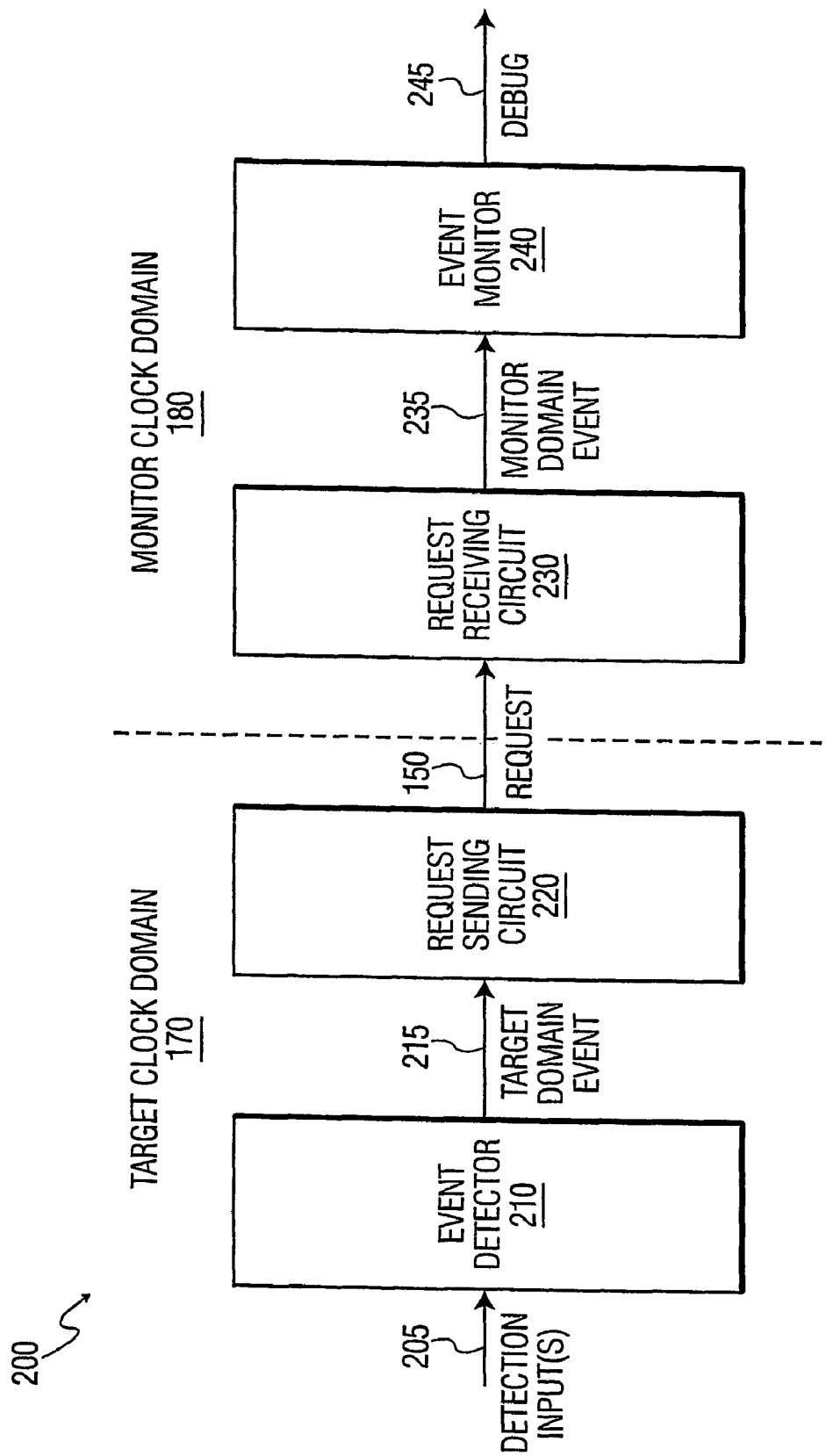
FIG. 2 shows the functional components and their interconnections in a first exemplary circuit for transferring events between clock domains.

FIG. 2 is a functional block diagram of a circuit for transferring events between clock domains, according to an embodiment of the invention. Transfer circuit 200 is simple, small in IC area required, low in latency, and able to run at high speeds; however, it imposes constraints on the clocks in the monitor and the target domains.

Transfer circuit 200 includes event detector 210 and sending circuit 220, each of which is clocked by the target clock signal. Target clock domain 170 includes the event detector and the sending circuit, as well as any other circuits that operate on this clock.

Transfer circuit 200 also includes receiving circuit 230 and event monitor 240, each of which is clocked by the monitor clock signal. Monitor clock domain 180 includes the receiving circuit and the event detector, as well as any other circuits that operate based on the monitor clock.

The circuits in each of the target and monitor clock domains 170 or 180 are preferably, but not necessarily, based on design techniques for synchronous, rising-edge-triggered digital circuits. In such circuits, an incoming signal is considered to be asserted in each clock cycle in which the value of the signal is high at the rising edge of the clock.

Specifically, consider an example in which an event signal enters a clocked logic element, e.g. a D-type flip flop, that has a set-up time and a hold time. The event signal is asserted once for each clock period in which the signal is high from at least one set-up time before the rising edge of the clock until at least one hold time after the rising edge.

If the event signal changes value at a time that violates the set-up time or hold time constraint, then the value output by the D flip flop is unpredictable or meta-stable. Such a meta-stable output signal may have the value of the event signal prior to the transition, the value of the event signal after the transition, or the output signal may be unstable and change in value. Typically, the meta-stability of the D flop ends with the next clock cycle in which the event signal does not violate constraints, but this depends on the design details of the D flop. It is possible for the meta-stable state to last for more than one clock cycle, although depending on design, processing, and operating parameters, this possibility can be made very unlikely.

Many standard clock signals and logic elements are rising-edge triggered; that is, the outputs of clocked elements depend on the inputs of the element when it is triggered by the rising edge of the clock. Many standard logic elements respond only to values of signals at the rising edge of the clock.

In contrast, request signal 150 encodes a request as either a rising edge or a falling edge, depending on the current value of the request signal. Receiving circuit 230 responds in the same manner to either the rising edge or the falling edge of request signal 150; that is, any change in the value of the request signal produces the same response.

Transfer circuit 200 is advantageously simple, high performance and small in the IC area that it requires. However, unlike transfer circuits 400 and 500 (described with regard to FIGS. 4 and 5), transfer circuit 200 circuit imposes a significant constraint on the relationship between the target domain and the monitor domain clocks. The monitor clock domain must run faster than target clock domain.

In a system in which the target clock domain runs faster than the monitor clock domain, then transfer circuit 200 cannot operate correctly—the target clock domain can generate more target events than the monitor domain can accept, detect, count or otherwise monitor.

The primary situation in which transfer circuit 200 operates correctly is when the period of the target clock is at least the sum of the period of the monitor clock plus the set up time required by the receiving circuit. Even under this constraint, it is possible for the first logic element within the receiving circuit, i.e., D flop 320B, to enter a meta-stable state. Nevertheless, because requests are encoded as transitions and not as values, a temporary meta-stable state in flop 320B does not result in faulty information transfer. Thus, even when a change in value of the request signal initially creates meta-stability, the change in value of the request signal is correctly interpreted in the next monitor-domain clock cycle.

In some SoC designs, it may not be realistic that the period of the target clock be at least the sum of the period of the monitor clock plus the set up time required by the receiving circuit. Such designs should make use of transfer circuits 400 or 500, which are described with respect to FIGS. 4 and 5.

A secondary situation in which transfer circuit 200 operates correctly is when the target clock and the monitor clock have equal periods and have an appropriate phase relationship. While transfer circuit 200 is superfluous in a system that always operates under this condition, transfer circuit 200 may be required if the clocks in such a system change, either due to intended changes in the operating mode of the system or due to unintended variations in the clocks.

In various embodiments of the invention, various detection inputs 205 are received by event detector 210. In some, the detection input or inputs are signals that are inherently part of the target circuit or module. In other cases, monitoring or debugging logic is added to a circuit for the purpose of generating detection inputs 205.

Typically, the design of detection inputs 205 and event detector 210 depend on the details of the circuit or module that is being monitored by monitor and debug module 140. Events that may be detected include one or more of, but are not limited to, the following:

An instruction address breakpoint, in which the program counter of a processor matches a target value, is within a range, or has specified bits that match target values;

An instruction operation breakpoint, in which the operation code that a processor executes matches a target value, is within a range, or has specified bits that match target values;

A data address breakpoint in which a load transaction, or a store transaction, or either a load or a store uses a data address that matches a target value, is within a range, or has specified bits that match target values;

A data value breakpoint in which a load transaction, or a store transaction, or either a load or a store uses a data value that matches target value, is within a range, or has specified bits that match target values;

An interrupt or exception occurring;

A circuit or module transitioning into a target mode of operation, such as user mode, kernel mode, supervisor mode, debug mode, or the like;

A performance monitoring event such as a cache miss, a pipeline stall, a branch mis-prediction, or the like;

A bus or memory controller selecting a target device or channel;

An on-chip phase-locked loop (PLL) obtaining a lock on an incoming signal, thus producing a reliable clock signal;

A buffer, or a first-in-first-out (FIFO) register overflowing or becoming empty;

A circuit or module entering or leaving a target state; or

A logical combination of two or more thereof, for example, a target FIFO register becoming empty when a target module is not in an idle state.

In response to the values of one or more detection input signals 205, event detector 210 generates one or more target-domain event signals 215, each of which is coupled to a corresponding instance of sending circuit 220. Each instance of sending circuit 220 has a corresponding instance of receiving circuit 230 and a corresponding instance of request signal 150.

In response to each assertion of target-domain event signal 215, sending circuit 220 changes the value of request signal 150, e.g., sending circuit 220 makes the request signal "0" if it is currently "1," or vice versa. It is advantageous to use a signal that encodes the same information as either a rising or a falling transition as request signal 150 because the request signal travels across clock domains. Because the request signal encodes a request as either transition, both the information conveyed by the request signal and the result of the request signal are independent of clock-based timing. Neither the phase of the target clock cycle nor the phase of the monitor clock cycle at which the request signal transition occurs has any impact on how receiving circuit 230 or event monitor 240 respond to the request signal.

In response to each change in value of an instance of request signal 150, the corresponding receiving circuit 230 makes one assertion of monitor-domain event signal 235. The monitor-domain event signal or signals are provided to event monitor 240. In response to the monitor-domain event signals, event monitor 240 generates one or more debug signals 245.

The design details of event monitor 240, the nature of debug signal or signals 245 that are generated, and the use made of the debug signals typically depend on the design details of the circuit or module that is being monitored by monitor and debug module 140. Event monitor 240 may include, but is not limited to, circuitry that performs one or more of the following:

Maintaining flags showing what types of target events have occurred, or have occurred subsequent to a target event;
Counting the occurrences of each type of target event;
Performing arithmetical operations on target event counts, for example, determining that there have been three occurrences of events of type A;
Performing logical operations on event flags, for example, determining that target events both of type A and of type B have occurred; or
Performing operations that are combinations of two or more thereof, for example, there have been at least two occurrences of events of type A and less than 1000 occurrences of events of type B.

Assertions of debug signals 245 may result in one or more of the following actions:

Pausing or stopping the operation of one or more circuits or modules by pausing or stopping the clock or clocks used in those circuits;
Sending a stop, pause or shutdown signal to one or more circuits or modules;
Encoding the current status of monitored events, values, and states into a message and sending the message via an output pin to debug or monitoring circuitry external to integrated circuit 100;
Forcing a value into a register within a circuit or module being monitored;
Forcing a value onto a bus; and
Forcing a circuit or module that is being monitored to change state.

In some cases, the debug signals used are inherently part of the target circuit or module. In other cases, monitoring or debugging logic is added to a circuit for the purpose of performing appropriate actions in response to debug signals.

Figure 3:
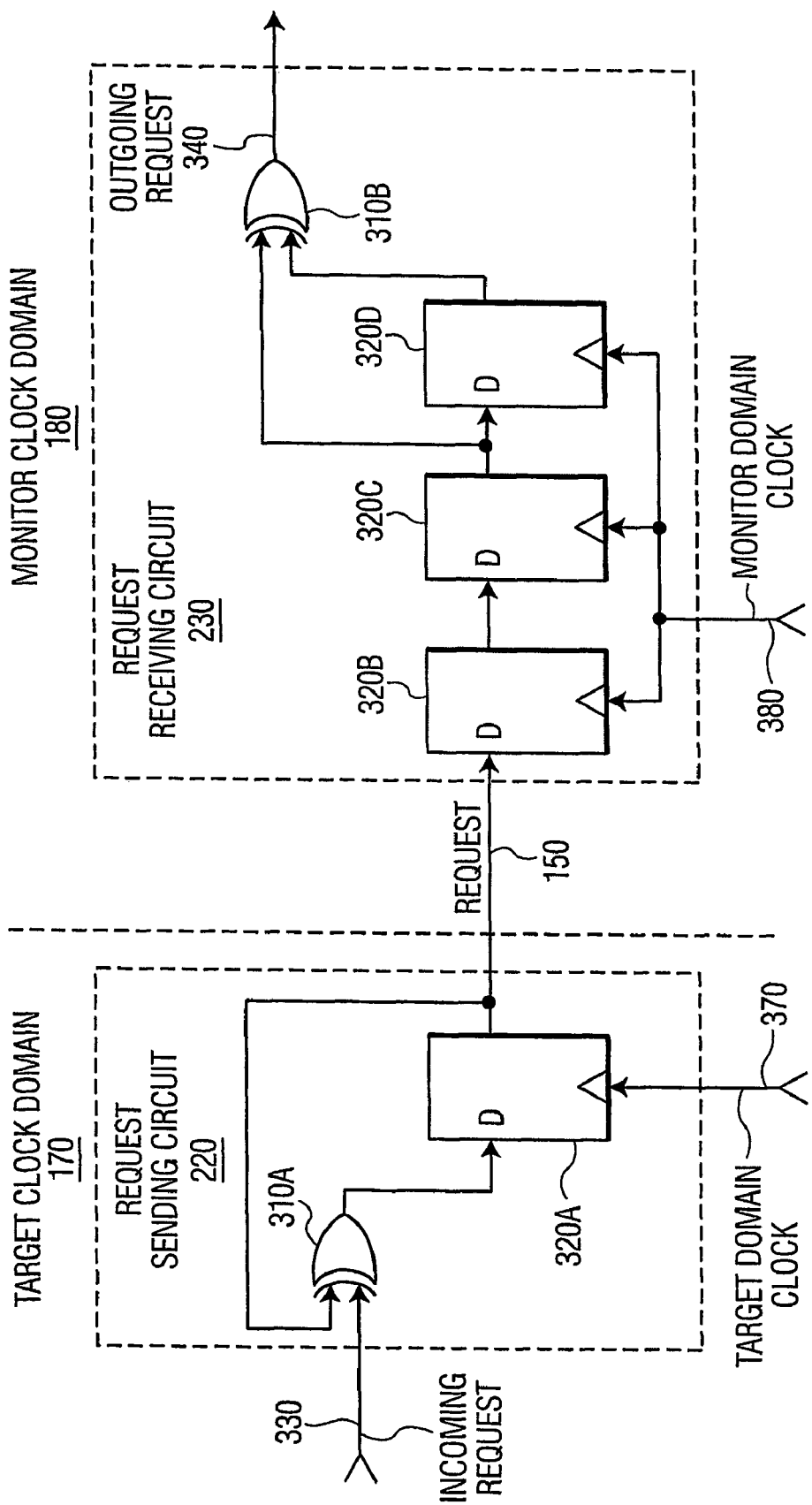
FIG. 3 shows the logic elements and their interconnections in a request sending circuit and a request receiving circuit according to an embodiment of the invention.

FIG. 3 is a logic diagram of a request sending circuit and a request receiving circuit according to an embodiment of the invention.

Request sending circuit 220 receives incoming request signal 330 and generates request signal 150. Sending circuit 220 changes the value of request signal 150 in response to each assertion of the incoming request signal. As used in transfer circuit 200 (described with respect to FIG. 2), target-domain event signal 215 is provided to the request sending circuit as incoming request signal 330. As used in transfer circuit 500 (described with respect to FIG. 5), transfer signal 522 is provided to the request sending circuit as incoming request signal 330.

Request receiving circuit 230 receives request signal 150 and generates monitor-domain request signal 340. In response to each change in value of request signal 150, receiving circuit 230 makes one assertion of outgoing request signal 340.

As used in transfer circuit 200, outgoing request signal 340 becomes monitor-domain event signal 235. As used in transfer circuit 500, transfer outgoing request signal 340 becomes receive signal 535.

Sending circuit 220 includes XOR gate 310A and D flip flop 320A. Request signal 150 is the output of D flip flop 320A, which is clocked by target-domain clock 370. The D input of flip flop 420A is the output of exclusive OR (XOR) gate 310A, which has two inputs. The first input of gate 310A is request signal 150. The second input is incoming request signal 320.

Receiving circuit 230 includes three D flip flops, 320B, 320C and 320D, which are clocked by monitor domain clock 380. These three flops are connected in series, that is, the D input of all but the first D flop is the output of the preceding D flop. One input of the first D flop in this series, 320B, is request signal 150. Outgoing request signal 330 signal 235 is the output of XOR gate 310B, whose two inputs are the outputs of D flops 320C and 320D.

Figure 4:
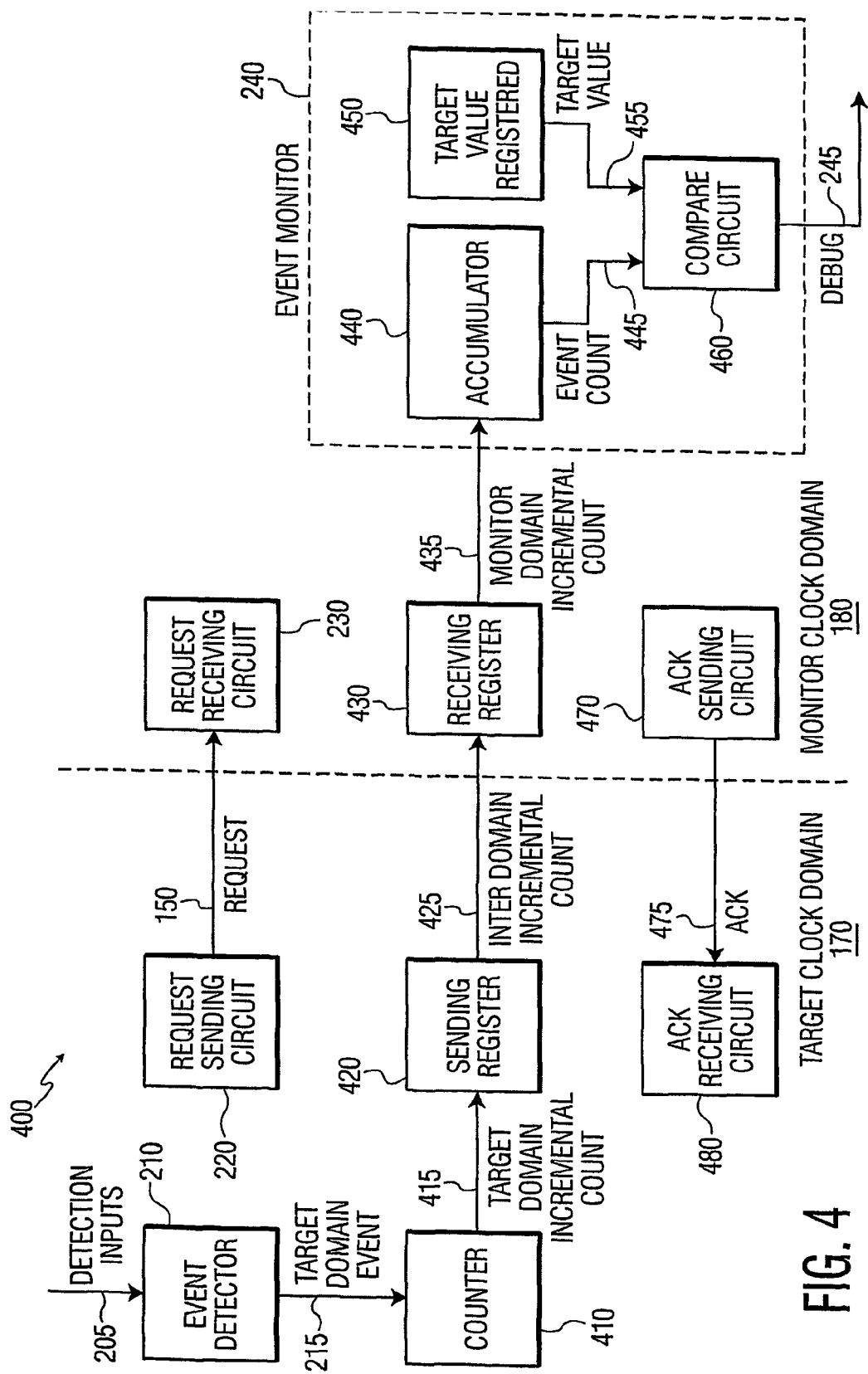
FIG. 4 shows the functional components and their interconnections in a second exemplary circuit for transferring events between clock domains.

FIG. 4 is a functional block diagram of another circuit for transferring events between clock domains according to an embodiment of the invention. Both transfer circuit 200 and transfer circuit 400 transfer events across clock domain boundaries. Both transfer circuits operate correctly when the monitor clock domain runs sufficiently faster than the target clock domain.

In comparison with transfer circuit 400, transfer circuit 200 is advantageously simpler, smaller in IC area, and has a lower latency between when a target event occurs and when it is transferred to the monitor domain.

In comparison with transfer circuit 200, transfer circuit 400 advantageously imposes fewer constraints on the clocks in the monitor and the target domains. Transfer circuit 400 operates correctly in the situation where the target domain and the monitor domain have equal clock periods, regardless of what the phase relationship is between the clocks. Also, transfer circuit 400 works in the situation where the monitor clock domain is faster than the target clock domain, but is not sufficiently fast to satisfy the constraint that the target clock period equal the monitor clock period plus the set up time required by the receiving circuit.

In the situation in which the target clock domain runs faster than the monitor clock domain, then transfer circuit 400 does not always operate correctly; i.e., the slower monitor clock domain may be unable to keep up with the events generated in the faster target clock domain. However, it will be clear to one skilled in that art that there may be specific systems in which the difference in clock rates, the rate at which events occur, the minimum delay between event occurrences, and the size of counter 410 are such that transfer circuit 400 does operate correctly.

Transfer circuit 400 includes, in target clock domain 170: event detector 210; counter 410; sending register 420; request sending circuit 220; and acknowledgement receiving circuit 480. Transfer circuit 400 also includes, in monitor clock domain 180: request receiving circuit 230; receiving register 430; acknowledgement sending circuit 470; and event monitor 240. Event monitor 240 includes target value register 450, accumulator 440, and compare circuit 460.

Event detector 210, request sending circuit 220 and request receiving circuit 230 are equivalent in design and operation to those described with regard to FIGS. 2 and 3, except that request signal 150 does not change its value with each occurrence of target-domain event signal 215. Rather, request signal 150 changes each time there is an incremental event count value that is ready to be transferred from sending register 420 to receiving register 430.

While a transfer of a first incremental count value is occurring and while the corresponding acknowledgement is being returned, counter 410 accumulates another incremental count value if necessary, that is, if the target event occurs during this period. Such an incremental count value will be transferred after the currently operating transfer of is complete.

Because the transfer is a relatively quick process, the maximum value of the incremental count is small; it need only be large enough to buffer events during the time required for performing synchronization overhead. For example, when transfer circuit 500 (described in reference to FIG. 5) transfers events between domains having the same clock period, no more than seven clock cycles can occur in the target clock domain before the transfer is complete.

Counter 410 generates an incremental count of the number of target-domain clock cycles in which target-domain event signal 215 is asserted. This count is accumulated only during a limited time period. In response to a transfer signal, counter 410 transfers the incremental count to sending register 420 and clears the value of the incremental count being held. In response to the same transfer signal, sending register 420 loads the incremental count from counter 410. The sending register then holds the incremental count value until the next occurrence of the transfer signal. Also in response to the transfer signal, request sending circuit 220 changes the value of request signal 150.

Request receiving circuit 230 detects changes in request signal 150 and, in response thereto, generates a receive signal. In response to the receive signal, receiving register 430 loads inter-domain incremental count 425 from sending register 420.

Also in response to the receive signal, acknowledgement sending circuit 470 changes the value of acknowledgement signal 475. Sending circuit 470 is equivalent in design to sending circuit 220. Circuits 470 and 220 are also equivalent in function, although the direction of the inter-domain transfer is reversed.

Acknowledgement receiving circuit 480 detects changes in acknowledgement signal 475 and, in response thereto, generates a target-domain acknowledgement signal. Receiving circuit 480 is equivalent in design to receiving circuit 230. Circuits 480 and 230 are also equivalent in function, although the direction of the inter-domain transfer is reversed.

A control circuit within target clock domain 170 generates the transfer signal based on the incremental count in counter 410 and on the target-domain acknowledgement signal.

Within event monitor 240, accumulator 440 receives the incremental count from receiving register 430, typically but not necessarily during the cycle of the monitor clock that is immediately subsequent receiving register 430 receiving the incremental count. Accumulator 440 holds event count 445, which counts occurrences of the target event. The accumulator updates count 445 by adding to it each incremental count value received.

Also within event monitor 240, target value register 450 holds target value 455. Target value 455, among the other target selections used, may be a predetermined value, or may be programmable by a user, or may be dynamically generated within event monitor 240. Compare circuit 460 compares target value 455 with event count 445 and, based thereon, asserts debug signal 245. Any logical or arithmetic comparison may be used, including but not limited to: equal, greater than, less than, less than or equal, and the like.

Figure 5:
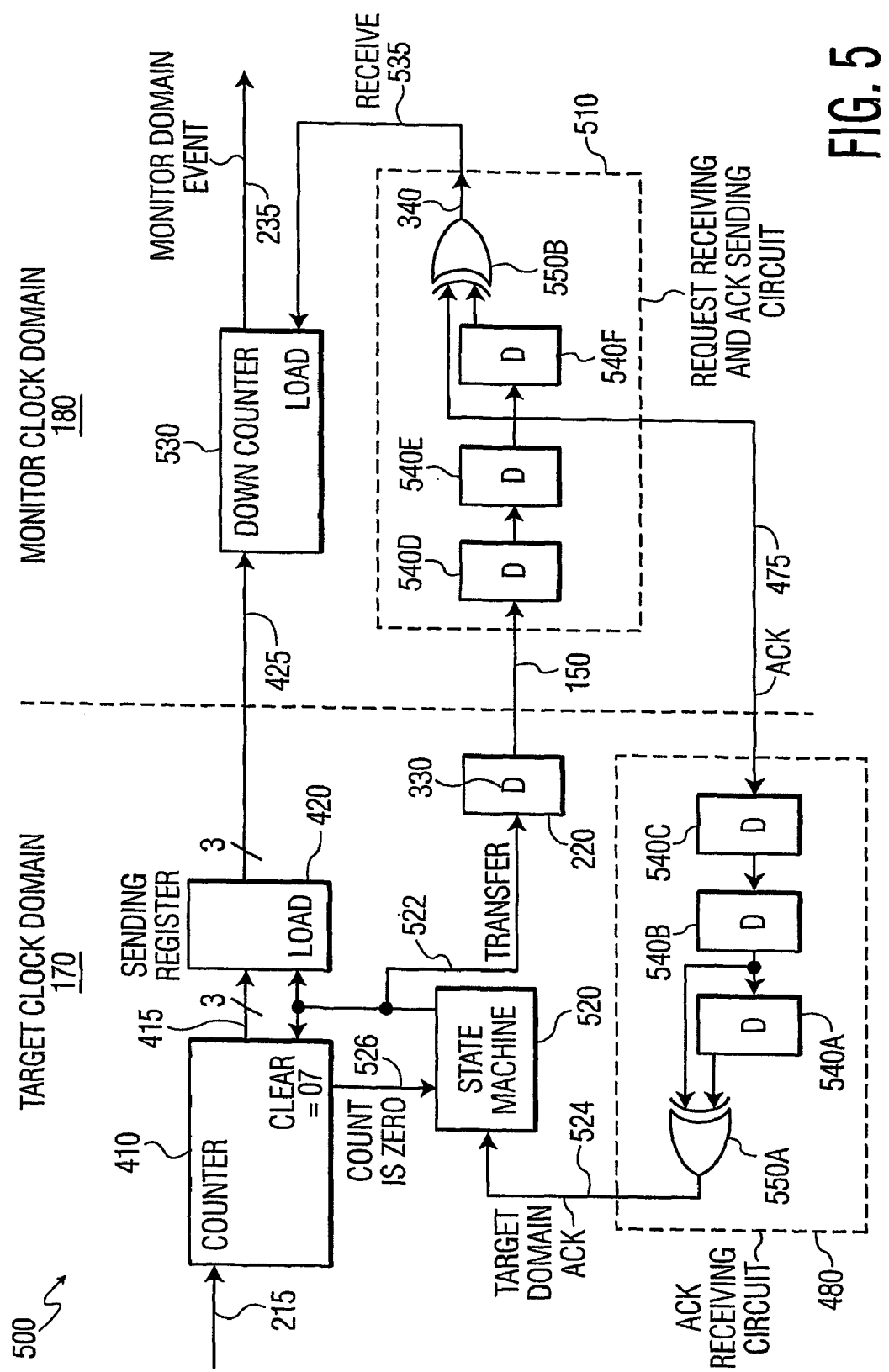
FIG. 5 shows the functional components and their interconnections in a third exemplary circuit for transferring events between clock domains.

FIG. 5 is a functional block diagram of a circuit for transferring events between clock domains according to an embodiment of the invention. Transfer circuit 500 imposes the same constraints on the clocks used as transfer circuit 400, and is thus unlike transfer circuit 200. Unlike transfer circuit 400 which generates an event count, transfer circuit 500 uses down counter 530 to generate events in the monitor domain that correspond to the target events. The choice between transfer circuit 400 and 500 can be made based on whether the system requires that the target events be counted or be re-generated.

Request sending circuit 220, counter 410, sending register 420, inter-domain incremental count 425, request signal 150, acknowledgement signal 475 and acknowledgement receiving circuit 480 are equivalent in operation and design to those described with regard to FIG. 4.

Down counter 530 receives inter-domain incremental count 425 from sending register 420 in response to receive signal 535. During subsequent clock cycles, down counter 530 decrements the value of the incremental count that is held in counter 530 and asserts monitor domain event signal 235. The assertion and decrementing continue until the incremental count value held in the down counter is zero. Ignoring latency, the number of monitor-domain events generated by down counter 530 exactly equals the number of target-domain events that are detected.

Request receiving and acknowledgement sending circuit 510 generates receive signal 535, and in this regard is equivalent in operation and design to request receiving circuit 230. Circuit 510 also generates acknowledgement signal 475, which is the output of intermediate D flop 540E. Circuit 510 is equivalent in function to the combination of request receiving circuit 230 and acknowledgement sending circuit 430, though circuit 510 is simpler, requires less IC area, and has lower latency in transferring events.

State machine 520 generates transfer signal 522, the assertion of which causes counter 410 to clear its value, sending register 420 to load target-domain incremental count 415, and request sending circuit to change the value of request signal 150.

State machine 520 generates transfer signal 522 based on the history and current value of target-domain acknowledgement signal 524 and the current value of count-is-zero signal 526. Specifically, the count held in counter 410 being non-zero triggers an assertion of transfer signal 522 except for the period of time during which state machine 520 is waiting to receive from the monitor clock domain an acknowledgement signal that indicates that the currently active transfer of an incremental count value is complete.

Figure 6:
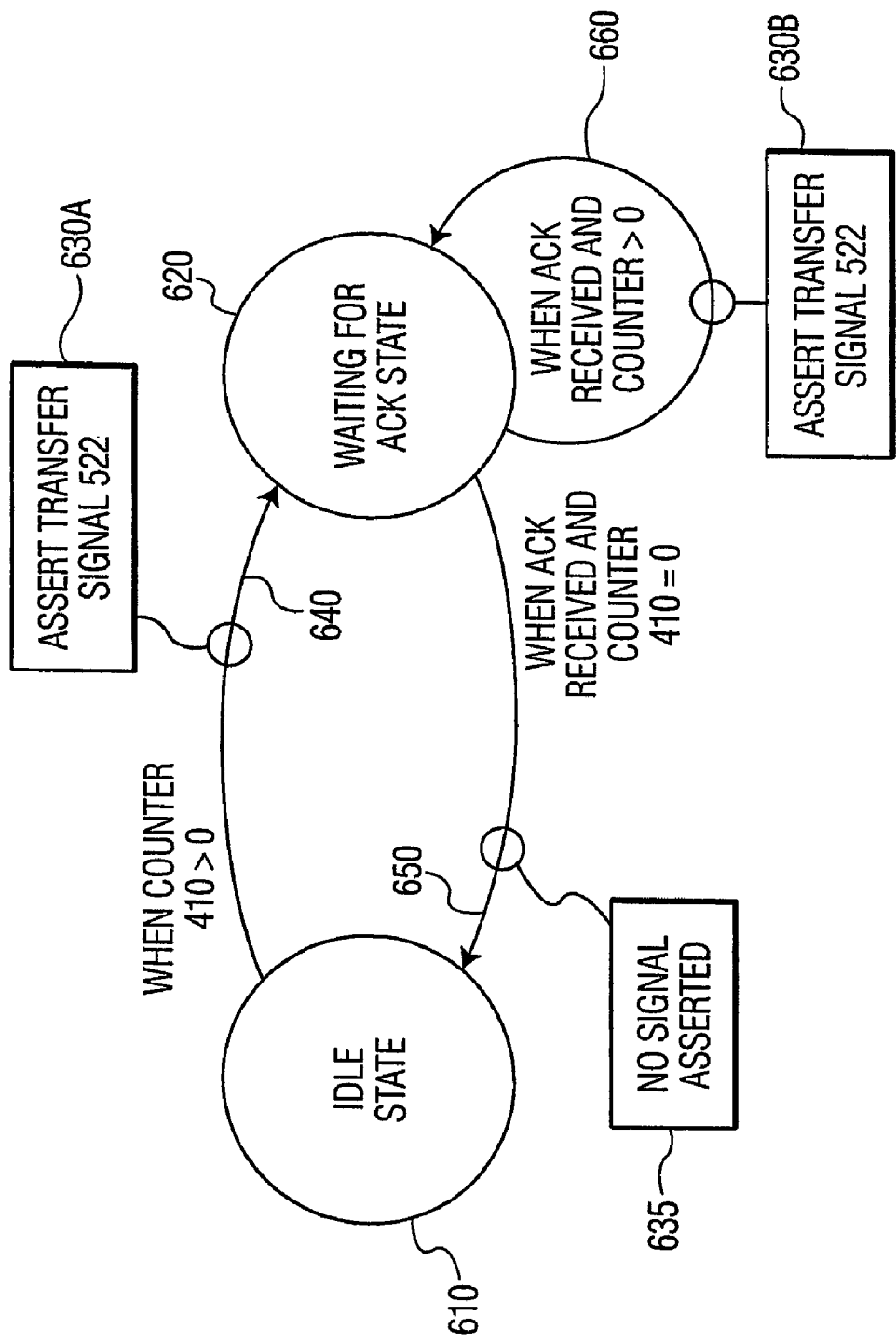
FIG. 6 illustrates two states in which an embodiment of the invention may operate and shows how this embodiment transitions between these states.

FIG. 6 is a state diagram of a finite state machine used in an embodiment of the invention. State machine 520 includes two states: idle state 610 and waiting for acknowledgement state 620.

Transition 640 occurs whenever state machine 520 is in idle state 610 and counter 410 is greater than zero, i.e., count-is-zero signal 526 is not asserted. Transition 640 causes the state machine to enter waiting for acknowledgement state 620. In addition, transition 640 triggers event 630A, in which state machine 520 asserts transfer signal 522 during the next clock cycle. As a result of asserting transfer signal 522, target-domain incremental count 415 is transferred from counter 410 to sending register 420, the value in counter 410 is reset to zero, and the value of request signal 150 is changed.

Transition 650 occurs whenever state machine 520 is in waiting state 620, counter 410 is zero, and target-domain acknowledgement signal 524 is asserted. Transition 650 causes state machine 520 to enter idle state 610. Transition

650 does not cause the state machine to assert any signals, which is shown in FIG. 6 as event 635.

Transition 660 occurs when state machine 520 is in waiting state 620, counter 410 is not zero, and an acknowledgement signal is received. Transition 660 leaves state machine 520 in waiting state 620. In addition, transition 660 causes state machine 520 to assert transfer signal 522 during the next clock cycle, which causes event 630B to occur. The semantics of event 630B are the same as those of event 603A, i.e., transfer signal 522 is asserted.

The invention can be exploited in industry, as will be obvious to one skilled in the art in light of the descriptions contained herein of the invention and of using the invention. The invention can be made using components and manufacturing techniques that are known or described herein. For example, integrated circuits containing flip flops and counters are well known.

The invention solves immediate problems and meets immediate needs that are described herein. For example, systems on a chip (SoC) are examples of ICs that both are likely to include multiple clock domains and are likely to require monitoring of events across clock domains.

The scope of the invention is set forth by the following claims and their legal equivalents. The invention is subject to numerous modifications, variations, selections, among alternatives, changes in form, and improvements, in light of the teachings herein, the techniques known to those skilled in the art, and advances in the art yet to be made. The figures and descriptions herein are intended to illustrate the invention by presenting specific details; they are not intended to be exhaustive or to limit the invention to the designs, forms and embodiments disclosed.

What is claimed is:

1. A circuit for transferring to a monitor clock domain target events that occur in a target clock domain, the transfer circuit comprising:
    a detector, in the target clock domain, configured to assert a target-domain event signal each time the target event occurs;
    a sending circuit, in the target clock domain, configured to change the value of a request signal each time the target-domain event signal is asserted; and
    a receiving circuit, in the monitor clock domain, configured to detect the change in value of the request signal, and to assert a monitor-domain event signal once for each change in value detected;
    a second detector, in a second target clock domain, configured to assert a second-target-domain event signal when a second target event occurs;
    a second sending circuit, in the second target clock domain, configured to change the value of a second request signal each time the second target-domain event signal is asserted; and
    a second receiving circuit in the monitor clock domain configured to detect the change in value of the second request signal, and to assert a second monitor-domain event signal once for each change in value detected;
    a monitor circuit, in the monitor clock domain, configured to increment a first count in response to the monitor-domain event signal, to increment a second count in response to the second monitor-domain event signal, to hold a first target value, to produce a first trigger signal by comparing the first count with the first target value, to hold a second target value, and to produce a second trigger signal by comparing the second count with the second target value;
    wherein the transfer circuit is adapted for use in a debug module within an integrated circuit, and the monitor circuit is further configured to assert a debug signal based on a signal selected from the first trigger signal, the second trigger signal, or a logical combination thereof.

2. The transfer circuit of claim 1, wherein:
    the transfer circuit is adapted for use in a debug module within an integrated circuit; and
    the transfer circuit further comprises a monitor circuit configured to assert a debug event signal in response to the monitor-domain event signal.

3. The transfer circuit of claim 1, wherein the period of the target clock is at least the sum of the period of the monitor clock plus the set up time required by the receiving circuit.

4. A circuit for transferring to a monitor clock domain target events that occur in a target clock domain, the transfer circuit comprising:
    a counter, in the target clock domain, configured to generate an incremental count of occurrences within a time period of the target event and, in response to a transfer signal, to transfer the incremental count and clear the incremental count;
    a sending register, in the target clock domain, configured to load the incremental count in response to the transfer signal, and to hold the incremental count, wherein the time period that the counter generates the incremental count includes the time period during which the sending register holds the incremental count;
    a request sending circuit, in the target clock domain, configured to change the value of a request signal in response to the transfer signal;
    a request receiving circuit, in the monitor clock domain, configured to detect the change in value of the request signal and, in response thereto, to generate a receive signal;
    a receiving register, in the monitor clock domain, configured to load the incremental count from the sending register in response to the receive signal;
    an acknowledgement sending circuit, in the monitor clock domain, configured to change the value of an acknowledgement signal in response to the receive signal;
    an acknowledgement receiving circuit, in the target clock domain, configured to detect the change the value of the acknowledgement signal and, in response thereto, to assert a target-domain acknowledgement signal; and
    a control circuit, in the target clock domain, configured to generate the transfer signal when the incremental count in the counter is non-zero and the target-domain acknowledgement signal has been asserted for each change in value of the request signal.

5. The transfer circuit of claim 4, wherein the receiving register is further configured to assert a monitor-domain event signal when the incremental count in the receiving register is non-zero and to decrement the incremental count each time the monitor-domain event signal is asserted.

6. The transfer circuit of claim 4, further comprising:
    a monitor circuit, in the monitor clock domain, configured to add the incremental count to an event count.

7. The transfer circuit of claim 6, wherein:
    the transfer circuit is adapted for use in a debug module within an integrated circuit; and
    the monitor circuit is further configured to hold a target value, to compare the event count with the target value, and to assert a debug signal based thereon.

8. A circuit for transferring to a monitor clock domain target events that occur in a target clock domain, the transfer circuit comprising:
- means, in the target clock domain, for detecting occurrences of the target event and for asserting, in response thereto, a target-domain event signal;
- means, in the target clock domain, for changing the value of a request signal response to the target-domain event signal;
- means, in the monitor clock domain, for receiving the request signal and for asserting a monitor-domain event signal in response to the value of the request signal changing;
- means, in the target domain, for counting occurrences of the target event within a time period, thereby generating an incremental count, and, when enabled, for transferring a non-zero incremental count and resetting the incremental count;
- means, in the target domain, for holding the incremental count received from the counting means, wherein the time period during which the counting means counts includes the time period during which the holding means holds the incremental count; and
- means, in the monitor domain, for responding to the change in value of the request signal by receiving the incremental count from the holding means and by changing the value of an acknowledgement signal; and
- means, in the target domain, for disabling the transfer of a non-zero incremental count until the acknowledgement signal changes value;
- wherein the value of the request signal changes each time that a non-zero incremental count is transferred.

9. The transfer circuit of claim 8, wherein:
the transfer circuit is adapted for use in a debug module within an integrated circuit; and the transfer circuit further comprises means for triggering a debug event in response to the monitor-domain event signal.

10. The transfer circuit of claim 8, wherein:
the value of the request signal changes each time the target-domain event signal is asserted; and
the period of the target clock is at least the sum of the period of the monitor clock plus the set up time required by the receiving means.

* * * * *